US012691941B2

(12) United States Patent
Zhdanov et al.

(10) Patent No.: US 12,691,941 B2
(45) Date of Patent: Jul. 28, 2026

(54) VEHICLE AUTOMATIC CONTROL

(71) Applicant: TOPCON POSITIONING SYSTEMS, INC., Livermore, CA (US)

(72) Inventors: Alexey Vladislavovich Zhdanov, Moscow (RU); Anton Ivanovich Stavitskiy, Moscow (RU); Salvatore Iacono, Baldissero Torinese (IT); Alexey Vladimirovich Kalmykov, Moscow (RU)

(73) Assignee: TOPCON POSITIONING SYSTEMS INC., Livermore, CA (US)

( * ) Notice: Subject to any disclaimer, the term of this patent is extended or adjusted under 35 U.S.C. 154(b) by 35 days.

(21) Appl. No.: 18/838,222

(22) PCT Filed: Jan. 9, 2023

(86) PCT No.: PCT/RU2023/000001
§ 371 (c)(1),
(2) Date: Aug. 13, 2024

(87) PCT Pub. No.: WO2024/151176
PCT Pub. Date: Jul. 18, 2024

(65) Prior Publication Data
US 2025/0145212 A1      May 8, 2025

(51) Int. Cl.
*B62D 15/02* (2006.01)
*A01B 69/04* (2006.01)
*B62D 6/00* (2006.01)
*G05D 1/43* (2024.01)
(52) U.S. Cl.
CPC .......... *B62D 15/025* (2013.01); *A01B 69/008* (2013.01); *B62D 6/002* (2013.01); *B60W 2710/207* (2013.01); *G05D 1/43* (2024.01)

(58) Field of Classification Search
CPC ........... A01B 69/008; B60W 2710/207; B62D 6/002; B62D 15/025; G05D 1/00–12; G05D 1/43
See application file for complete search history.

(56) References Cited

U.S. PATENT DOCUMENTS

| | | |
|---|---|---|
| 7,477,973 B2 | 1/2009 | Brewer et al. |
| 7,860,628 B2 | 12/2010 | Lange |
| 8,892,308 B2 | 11/2014 | Davis et al. |
| 9,347,205 B2 | 5/2016 | Kosarev et al. |
| | (Continued) | |

FOREIGN PATENT DOCUMENTS

| | | |
|---|---|---|
| RU | 2562215 C2 | 9/2015 |
| RU | 2778692 C1 | 8/2022 |

OTHER PUBLICATIONS

International Search Report and Written Opinion mailed Sep. 21, 2023, in connection with International Patent Application No. PCT/RU2023/000001, 6 pgs.

*Primary Examiner* — Mark L. Greene
(74) *Attorney, Agent, or Firm* — Chiesa Shahinian & Giantomasi PC

(57) ABSTRACT

A vehicle autosteering system having a controller determines steering commands based on GNSS receiver position data, inertial measurement system data, and steering shaft rotation encoder data. The controller outputs a signal to drive an electric motor that rotates the vehicles steering shaft, changing the steering angle and guiding the vehicle along a predefined path e.g., a straight line.

12 Claims, 11 Drawing Sheets

(56)        References Cited

U.S. PATENT DOCUMENTS

| | | |
|---|---|---|
| 2005/0171693 A1 | 8/2005 | Lange et al. |
| 2013/0014480 A1 | 1/2013 | Arnold et al. |
| 2017/0308091 A1 | 10/2017 | Bunderson et al. |
| 2019/0101931 A1 | 4/2019 | Ogura et al. |
| 2022/0095526 A1 | 3/2022 | Shen et al. |
| 2025/0042469 A1* | 2/2025 | Shen .................... A01B 69/008 |

* cited by examiner

300

305

310

320 320

320 320

325

110

327

330

325

332

335

337

339 340

342

330

350

355

325

360 328

392 385

390 320

320

1202

1206

Network Interface

1208

I/O

1204

Processor

1212

Storage

1210

Memory

VEHICLE AUTOMATIC CONTROL

This application is a National Stage under 35 U.S.C. 371 of International Patent Application No. PCT/RU2023/000001, filed Jan. 9, 2023; the disclosure of which is incorporated herein by reference in its entirety.

FIELD OF THE INVENTION

The present disclosure relates generally to automatic vehicle control and steering angle estimation based on Global Navigation Satellite System (GNSS) data, inertial data, and steering shaft encoder data.

BACKGROUND

Certain vehicle platforms have four wheels with a pair of wheels on each of two axles. On many vehicles, the front or rear wheels can be turned (e.g., change the wheel angle) to steer the vehicle toward a desired direction. In some vehicles, both the front and rear wheels can be turned relative to the vehicle's central axis (e.g., longitudinal axis) to follow a predefined path. Vehicles, such as agricultural tractors and harvesters, may have the ability to turn the wheels of the front and/or rear axles in order to operate in a field and make corrections in order to follow parallel straight lines (e.g., swaths). Parallel straight lines are generally the most typical path shape for ploughing, cultivating, spraying, harvesting and other operations.

It is difficult for an operator to accurately steer a vehicle manually without overlapping or underlapping neighboring parallel lines. Line accuracy is important for proper plant growth and ongoing vehicle operations during planting and growing season. Proper distancing between neighboring swaths allow for the efficient use of available soil area. Although mechanical markers or paint markers located on the edges of an agricultural implement attached to the vehicle can aid in maintaining spacing between neighboring swaths, they do not improve line accuracy and do not work well in low visibility environments such as when there is fog, dust, or rain present. In addition, the accuracy of manual steering also degrades with increasing operator fatigue.

To resolve these issues, autosteering systems were developed to assist an operator by steering the vehicle. Many of those systems are based on Global Navigation Satellite System (GNSS) technology. A main component of such a system is the navigation receiver that is used to receive and process radio signals from satellites in order to provide position data. A receiver antenna can be installed on a tractor cab roof for good sky visibility. There are several such satellite systems used in various countries: United States—GPS, Russia—GLONASS, European Union—GALILEO, China—BEIDOU. Many receivers are configured to receive signals from one or more of those systems. Receivers are configured to calculate three-dimensional (3D) coordinates of a vehicle (e.g., a tractor) in a global Earth coordinate frame. Those 3D coordinates are converted into a local site two-dimensional (2D) coordinate frame, which allows determination of the current position of the tractor on the plane of a field. A control system draws a virtual line in the 2D coordinate frame to represent a required swath and additional parallel lines separated by a predetermined distance based on implement width. A typical line is a straight line which can be defined by an operator, for example, by selecting two points separated in space (e.g., points A and B) on the ground of a physical location of the vehicle.

Position accuracy is important especially for crops that are planted arranged in rows. The accuracy that is required can be on the order of a few centimeters. GNSS technology does not by itself provide such accurate position determination. GNSS technology can typically provide accuracy on the order of one or more meters. Centimeter accuracy can be achieved only with the help of differential corrections that are distributed by various broadcast means such as satellite signals, cell phone networks, and/or dedicated radio modems (e.g., operating in 400 MHz or 900 MHz frequency ranges). Corrections facilitate compensation for errors that occur due to several reasons including navigation satellite signal generation by satellite electronics, the position of satellites, and atmospheric conditions. Accurate and precise technologies are real time kinematic (RTK) and precise point positioning (PPP). RTK determines corrections using the observation space representation (OSR) approach which groups errors together and is typically based on ground broadband (e.g., high speed) broadcast means. PPP determines corrections in a state space representation (SSR) as a single stream of correction data representing individual error components within a serviced area. PPP provides a benefit over RTK techniques in terms of required bandwidth and PPP is typically based on satellite telecommunication services (e.g., Inmarsat, Globalsat etc.).

Based on a known tractor position, it is possible to calculate a distance (i.e., a perpendicular offset referred to as a cross track) between the tractor and a desired line and represent this number to an operator on a screen located in a cab of the machine to be compensated for by manual steering to achieve a zero value. Such systems are referred to as guidance systems. A more advanced system is an autosteering system which automatically steers a machine using actuators to achieve a zero value. This improves steering accuracy compared to the manual approach and minimizes operator fatigue.

An autosteering controller can include an inertial measurement unit (IMU) in addition to a GNSS receiver to provide motion data. The IMU can include a combination of inertial sensors such as accelerometers and gyros. An accelerometer can be used to measure acceleration (e.g., a specific force) which can be a combination of gravity and dynamic (e.g., moving) components. A gyro can be used to measure angular rate (e.g., rotation rate). Both the accelerometer and the gyro can have three axes (XYZ) supporting determination of movement with 6 degrees of freedom (6 DOF). Data from the IMU can be used with data pertaining to GNSS position and velocity in order to calculate a machine state vector including an accurate machine position, a linear velocity, an attitude (pitch, roll, heading), and an attitude rate. Roll can be used to compensate for machine tilt in order to determine GNSS antenna position from the roof of a cab of a machine with respect to the ground. Based on this information, a cross track on the plane of the ground on which the machine is located can be calculated. A weighted combination of cross track and angular heading offset (i.e., the difference between tractor heading and required line heading) together can be used as a metric to generate an angular control signal to change the wheel angle. The more cross track or angular heading offset, the more wheel angle is required to return the machine to the desired line as fast as possible. An actuator can be used to change wheel angle.

A hydraulic cylinder can be used as an actuator for changing a current wheel angle. Two types of actuators are generally used to turn wheels automatically. The first type is a hydraulic valve connected to the vehicle's hydraulic steering system. The second type is an electrical motor that is configured to rotate a steering wheel shaft of the vehicle that commands the vehicles hydraulic steering system to actuate. The electric motor type is popular in industry and for aftermarket installation due to the speed and ease of installation. The electric motor eliminates the need to change machine hydraulics and there is little to no risk of voiding a warranty because of unauthorized machine hardware modification.

One approach is a variant of the above-mentioned electrical steering motor. This approach includes an electrical motor having a high torque (direct drive motor) and a rotor connected to a steering shaft of the vehicle. The stator is connected to the body of the machine. A steering wheel for manual operation is located on the top of the rotor. The motor is an in-runner hollow type. An internal motor controller receives an angular command from an autosteering controller and rotates the steering shaft until the required wheel angle position is achieved. Wheel angle position is the angle between the machine central axis and the wheel radial axis in a horizontal frame measured by a wheel angle sensor (WAS). Such a sensor is an electrical device mounted to a tie rod which is a part of the Ackermann geometry of the steering linkage of the vehicle. A signal from the sensor is read by the internal motor controller and negative feedback to a control loop is established.

However, use of a WAS in this type of application is unreliable because it is mounted in a location that is very dirty, experiences high shock and vibration forces and is subject to direct mechanical impact on its enclosure from plants, stones and other external objects. The WAS has an environmentally sensitive component, such as a potentiometric (resistive) strip or an optical or magnetic strip, and mechanical linkage with bearings to convert wheel turning into a sensor sensitive axis movement. Connecting a WAS to a tie rod of the Ackermann geometry can be difficult and sometimes not possible to do reliably due to the limited space available at the required location on a machine. The life span of a WAS is typically short in this application because of all the above-mentioned issues. It can often be broken and require frequent service. Moreover, machines such as windrowers with only two (left and right) wheels without Ackermann geometry do not facilitate installation of a WAS. The machine is steered at a differential rate between the steered wheels (e.g., by individual hydraulic motors). The same issue exists for tracked machines with two (left and right) tracks.

A steering control approach can use a position control loop. In this approach, position means angle (i.e., the angle of the wheels). The control loop requires a WAS to determine the wheel angle in order to control the wheel angle. Another approach is to use speed control. Speed is the first derivative of position. In this case, speed means angular rate. Instead of the autosteering controller outputting a command to turn the wheels to a specific angle, the autosteering controller can output a turn rate command. In response, the motor will rotate the steering shaft at a specified rate until a desired result is obtained (i.e., a metric of the weighted combination of cross track and angular heading offset approach zero). Although speed control does not require a WAS, steering accuracy, especially at slow vehicle travelling speeds, often degrades and fails to maintain centimeter level accuracy. One reason for accuracy degradation is noise in the turn rate command in conjunction with natural noise of the IMU and GNSS measurements which are used for the calculations. During speed control operation, steering wheel turning appears as a continuous dithering clockwise (CW) and counterclockwise (CCW). Vehicles can not accurately follow a path because of this dithering. This dithering also causes excessive wearing of the hydraulic steering unit spool as well. Filtering (i.e., noise smoothing) using a low pass filter (LPF) may reduce dithering but introduces delay (e.g., latency) in the control loop and causes the steering to become too slow.

To avoid increasing delay caused by filtering, an additional gyro may be mounted to a tie rod of the machine. The benefit of this approach is the absence of any mechanical linkage or bearings. The gyro autonomously measures the angular rate of wheel turning and this rate can be mathematically integrated to determine an angle while limiting noise. This approach is more reliable than use of a mechanical WAS but it still has issues with placement in tight space, protection against mechanical impacts, sensor cost and installation time. Moreover, the performance of a controller using such a gyro is limited because it requires filtering. A smoothing filter has a long convergence process because of an initially unknown wheel angle. The long convergence process is necessary to estimate and track gyro bias (e.g., the unknown offset from a true value) and accuracy degradation at slow vehicle movements because of this estimation. The machine must be driven for some time in order for filter initialization and convergence to occur. As such, it is not possible to perform accurate machine control during the convergence process. Moreover, there is no way to use this approach for windrower or tracked types of vehicles.

What is needed is a vehicle steering system that can steer a vehicle accurately without sensors installed on wheels, tracks, or other steering components that are exposed to environmental elements.

SUMMARY

A method for steering a vehicle includes the step of receiving vehicle position data from a Global Navigation Satellite System (GNSS) receiver. Vehicle motion data from an Inertial Measurement Unit (IMU) is also received along with steering shaft encoder data from a steering shaft rotation encoder. A current wheel angle of the vehicle is determined based on the vehicle position data, vehicle motion data, and steering shaft encoder data. A steering command is determined based on the current wheel angle and a desired wheel angle. In one embodiment, the current wheel angle of the vehicle is determined using the equation $a \tan(L * \omega_z / V)$ where L is a length between a front axle and a rear axle of the vehicle, $\omega_z$ is a vertical angular rate of the vehicle; and V is longitudinal speed of vehicle. The result of that equation can be filtered using a second order closed loop filter that uses encoder data multiplied by a reduction ratio factor. In one embodiment, the desired wheel angle is determined using the equation $w_1 * Y + w_2 * \theta$ where $w_1$ and $w_2$ are weight factors, Y is a cross track metric, and $\theta$ is an angular heading offset.

A computer readable medium for automatic steering and an automatic steering system for a vehicle comprising a GNSS receiver for transmitting data to a steering controller, an IMU, a steering shaft encoder, and a steering motor are also described.

BRIEF DESCRIPTION OF THE DRAWINGS

In the drawings, like numerals describe similar components in different Figures. Like numerals having different letter suffixes represent different instances of similar components and/or signals.

DETAILED DESCRIPTION

Figures 1, 2:
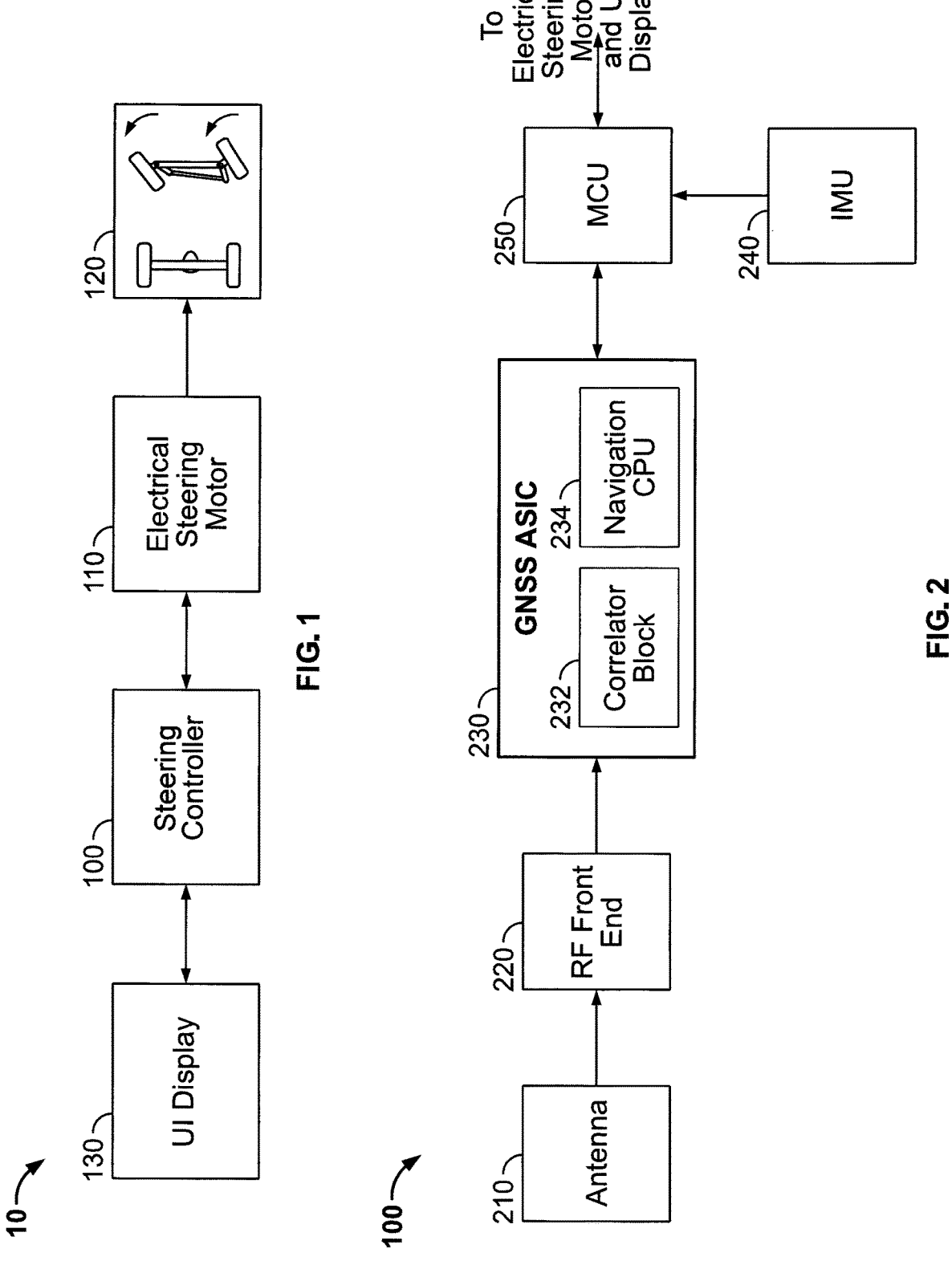
FIG. 1 shows a schematic of an automatic steering system according to one embodiment.
FIG. 2 shows a schematic of steering controller according to one embodiment.

FIG. 1 shows a schematic of an automatic steering (autosteer) system 10 according to one embodiment. Steering system of vehicle 120 is actuated by electrical steering motor 110. Steering controller 100 is in communication with electrical steering motor 110 and transmits a steering command to electrical steering motor 110 based on data received from various sensors which are described in greater detail below. Steering controller 100 is also in communication with user interface (UI) display 130 which can be used to display information to, and receive input from, an operator of a machine that is associated with steering system of vehicle 120. An operator can use UI display 130 to change parameters of steering controller 100, parameters of steering motor 110, view the system status, and view or set a path for the machine to travel along.

Steering system of vehicle 120 can be one of several types that are used with vehicles having various numbers of wheels and axles. A typical vehicle has four wheels with two axles where a front axle supports two wheels and a rear axle supports two wheels. Such a vehicle 120 can be steered by rotation of the front wheels CW or CCW about their vertical axes to turn right or left. An agriculture machine (e.g., a tractor) can have a hydraulic cylinder mounted laterally with respect to the central axis of the machine and a shaft connected to a tie rod of an Ackermann type steering geometry in order to turn the steerable wheels. The hydraulic cylinder is operated by hydraulic fluid which flows from a pump energized by a diesel engine of the machine. The flow of fluid required to turn the wheels in each direction can be changed by a hydraulic steering unit. A typical hydraulic steering unit receives mechanical input from a steering wheel shaft manually rotated by the machine operator using a steering wheel. In one embodiment, the hydraulic steering unit receives mechanical input from the steering wheel shaft with the steering wheel shaft being rotated by an electrical motor.

FIG. 2 shows a schematic of a steering controller 100 according to one embodiment. Antenna 210 is configured to receive signals from GNSS satellites. Various types of antennas can be used to receive the Global Navigation Satellite System (GNSS) signals. For example, patch and spiral antennas can be used to receive circularly polarized waves. The antennas used typically have a low noise amplifier (LNA) to amplify signals that are often under a natural noise level and to filter out the signal from interference. Antenna 210 transmits received signals to RF front end 220 which further amplifies the signals, converts the signals to an intermediate frequency, and filters interference. The signal is then digitized (e.g., sampled by time and quantized by level) and processed by GNSS ASIC 230 to generate position data (e.g., vehicle position data). Antenna 210, RF front end 220 and GNSS ASIC 230 can be referred to as a GNSS receiver which outputs position data. GNSS ASIC 230 has two main components: correlator block 232 and a navigation CPU 234. Correlator block 232 demodulates the navigation signal from a pseudorandom noise code and carrier. Navigation CPU 234 estimates pseudo range, carrier phase, and the Doppler frequency. Navigation CPU 234 also estimates signal energy and analyzes the received data (e.g., the information stream) using satellite parameters, almanacs, and ephemerids. The information stream allows calculation of the position of satellites in the sky. In one embodiment, information from at least four satellites is used to estimate the following parameters: machine position, velocity and a time difference between a GNSS receiver clock reference and a system time to which satellite clocks are synchronized. Various coordinate systems can be used for position calculation. In one embodiment, a coordinate system for vehicle steering is a local East-North-Up (ENU) Cartesian frame connected to a ground plane. Speed is estimated as a vector with XYZ (ENU) components with module V along vehicle longitudinal axis. V is calculated according equation $$V = \sqrt{V_x^2 + V_y^2}$$

where $V_x$ and $V_y$ are mentioned speed components. A navigation engine in the navigation CPU uses equations that set mathematical dependencies between antenna 210 position, positions of satellites, antenna speed, satellite speeds, pseudo ranges, carrier phase measurements, Dopplers and time differences.

The positions of satellites are not accurately known. The satellite onboard clock has a drift and pseudo ranges and carrier phases are distorted by delays in the atmosphere (e.g., the ionosphere and the troposphere). To compensate for these delays, differential GNSS is used. Local base stations or networks of GNSS receivers are installed in known positions on the ground and measure a similar set of pseudo ranges and carrier phases. These base receivers are subject to almost the same error that steering controller 100 experiences. Navigation CPU 234 uses these corresponding measurement sets of pseudo ranges and carrier phases to self-compensate for errors and to calculate the position of antenna 210 as a vector between it and a base station. The known positions and the vector are then used to determine an accurate position of steering controller 100. This method is referred to as a Real Time Kinematic (RTK) method. Another method is called Precise Point Positioning (PPP)

and uses an approach that directly removes the above-mentioned errors. Typical accuracy of RTK is less than a centimeter, while PPP is typically within a few centimeters. Both methods are widely used for agriculture applications. Separate radio channels are used to broadcast correction data for PPP and RTK. The radio channel can be from a dedicated radio modem, a cell phone network, or a satellite channel.

Inertial measurement unit (IMU) 240 measures inertial values and outputs motion data. For example, when IMU 240 is mounted to a vehicle, it outputs vehicle motion data. In one embodiment, IMU 240 contains three axis accelerometers and three axis gyros. Gyros measure angular rates (rotation) and accelerometers measure accelerations. The accelerometers measure a vector sum of gravity and dynamic accelerations associated with machine movement. Both gyros and accelerometers provide XYZ components in a machine body frame (e.g., a coordinate frame fixed to machine) with axes aligned with the machine's central axis X (e.g., longitudinal axis), lateral axis Y, and vertical axis Z. Acceleration components are defined as Ax, Ay, and Az. Angular rates are defined as $\omega_x$, $\omega_y$, and $\omega_z$.

IMU measurements typically have two types of errors. Multiplicative errors such as scalar factor, non-orthogonality and additive errors such as bias. Multiplicative errors are typically compensated for by factory calibration using a rate table at the time of production. Bias can be compensated for at the factory only partially. Integration with GNSS using long-term stable measurement is required to remove the impact of bias error. In one embodiment, IMU 240 provides complementarity with its short-term stable measurement. Integration allows for stable results both in the short-term and in the long-term. In other embodiments, IMU 240 contains less sensors and axes including an embodiment in which only a vertical (Z axis) gyro is used to measure $\omega_z$.

Microcontroller unit (MCU) 250 performs this integration and uses position and inertial measurements to calculate a control signal for electrical steering motor 110 (shown in FIG. 1). In one embodiment, there are two sequenced stages: estimation and control. MCU 250 combines data to estimate machine attitude angles including pitch, roll, and heading as well as to improve the accuracy of position and velocity estimation. The tilt angles, pitch and roll, facilitate proper projection of the antenna position on the cab roof top to the ground on which the machine is located. Together with heading they facilitate calculation of control signals based on two metrics: cross track and angular heading offset. Cross track is the perpendicular length between the tractor position on the ground projection and the desired trajectory. Angular heading offset is the angle between the trajectory direction and the machine longitudinal axis direction (heading). A weighted sum of these two metrics forms a control goal of a wheel angle setpoint $\delta_{setpoint}$. In a steady mode (e.g., all transition processes are complete) both metrics became zero.

In one embodiment all mentioned components 210,220, 230,240,250 are packaged in a single enclosure installed on the cab roof of the machine for satellite visibility. In other embodiment components may be separated and have different enclosures. Antenna 210 can be installed on the cab roof with its own enclosure according to one embodiment. IMU 240 can be mounted to the machine frame with its own enclosure. RF front end 220 and GNSS ASIC 230 can be in the same module installed in the cab with their own enclosure or combined with UI display 130. MCU 250 can be installed in the cab with its own enclosure or combined with UI display 130.

Figure 3:
FIG. 3 shows a steering wheel assembly having an electric motor according to one embodiment.

FIG. 3 shows a steering wheel assembly 300 having an electrical steering motor 110 according to one embodiment.

In this embodiment, electrical steering motor 110 is an in-runner hollow type motor. Steering wheel 305 is used by an operator of a machine for manual steering (e.g., on a road, field, or other surface) and to override the automatic system if something or someone spontaneously appears in the path of the machine and the operator reflexively turns the steering wheel to avoid an accident. A decorative plastic cover 310 conceals mounting hardware and typically has a logo of the company that built the machine or the vendor of the steering equipment. Various bolts and fasteners 320 are used to hold the assembly together. Bearing system 325 allows the parts to rotate relative to each other with minimal friction force. Housings 327 and 328 are halves of a mechanical enclosure configured to protect the motor from environmental impacts and to isolate the operator and the machine from internal electric circuits. Gaskets 330 provide dust and water ingress protection (IP). Strong permanent magnets made from rare earth metal (typically neodymium) alloy forms multipolar ring 332 mounted to hollow rotor 337. Hollow rotor 337 rotates steering shaft relative to housing 328 which is rigidly mounted to the machine body. Multipolar stator 335 generates alternating magnetic fields which interact with a permanent magnetic field of ring 332 and rotates it. Stator 335 contains a plurality of electrical coils.

Encoder 339 (also referred to as a steering shaft rotation encoder) comprises indexed/coded disk 340 and optic sensor 342 and is located in steering wheel assembly 300 and produces steering shaft encoder data. In one embodiment encoder 339 is a high precision incremental optical type encoder with disk 340 rigidly mounted to rotating rotor 337. Optic sensor 342 has an LED and a photoelement and is rigidly connected to housing 328. The light from the LED passes through slots of disk 340 and the amount of rotation can be detected by counting the number of pulses output from the photoelement of optic sensor 342. The photoelement in optic sensor 342 can be a photodiode or a phototransistor. A rotation angle can be calculated as a product of a fixed known angle between neighboring slots and a number of counted pulses. To determine rotation direction (e.g., CW or CCW), two photoelements with some angular shift are installed inside optic sensor 342. An incremental encoder outputs an angle between the steering shaft and the machine body but with some bias, which changes each power cycle if the operator manually rotates the steering wheel at a motor power off condition.

In other embodiments, the encoder is an absolute type which does not have a new bias each power cycle. The absolute type encoder uses end switches or a more complex coded indexing disk. An end switch type encoder requires rotation of the wheel to end positions for angle initialization each power cycle. A coded disk type can determine the absolute angle without rotation of the wheel.

Other types of encoders can be used based on magnetic (Hall sensor) or potentiometric principles for other embodiments.

Motor controller board 350 has a power supply unit and a microcontroller. The microcontroller is configured to read the output of optic sensor 342 of encoder 339. Microcontroller board 350 is also configured to operate control coils 335 in order to achieve a desired rotation of electrical steering motor 110. Motor controller board 350 controls status LED 360 which can be illuminated to provide an indication that the autosteering system 10 is active. Motor controller board 350 also provides a data interface via connector 355 to steering controller 100. In one embodiment, the interface uses a controller area network (CAN) protocol. Switch 385 is used to turn autosteering system 10 on or off. Air valve 390 with mounting plates 392 allows equalization of the pressure inside the enclosure formed by housing halves 327 and 328 with atmospheric pressure.

Figure 4:
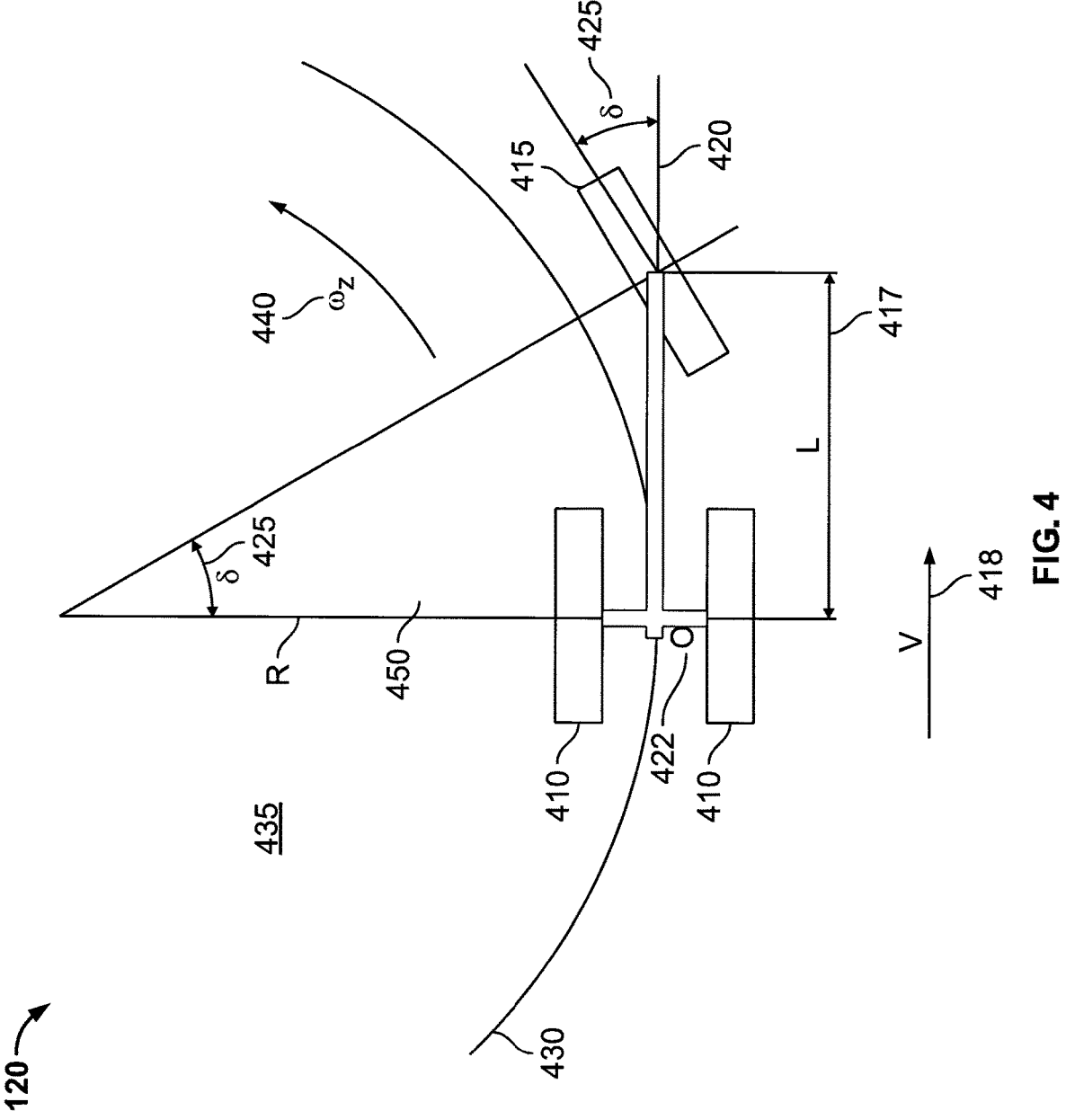
FIG. 4 shows the parameters associated with a front-wheel steered vehicle.

FIG. 4 shows the parameters associated with a front-wheel steered vehicle. An overhead view of a tricycle model of vehicle 120 is used to explain and calculate steered vehicle kinematics. Differences between a typical four-wheel machine and the tricycle can be considered negligible and the tricycle can be used for the sake of simplicity of understanding geometry. Vehicle 120 has a pair of non-steerable rear wheels 410 and front wheel 415 that is steerable. The length between the front and rear axles is denoted as L 417. Vehicle 120 moves with linear speed V 418 directed along central axis 420 which is calculated in steering controller 100 as explained above. Front steerable wheel can be turned from central axis 420 on angle δ 425 by a hydraulic cylinder that is actuated in response to rotation of a steering shaft turned manually using a steering wheel or turned by an electrical steering motor according to the method described above. The steerable wheel can be turned from a current wheel angle to a desired wheel angle in response to data received from sensors. Wheel 415 turned as shown causes special point O 422, located at the middle of the rear axis of vehicle 120, to move along circle 430, which has radius R 435, at vertical angular rate $\omega_z$ 440. The apex of triangle 450 located near the center of a circle 430 has angle δ 425 which is equal to steering angle δ 425. Angle δ 425 (e.g., the current wheel angle) can be determined using the equation:

$$\delta = a\tan\left(\frac{L}{R}\right) = a\tan\left(\frac{(L*\omega_z)}{V}\right) \qquad (1)$$

$$\text{where } V = \omega_z * R$$

Angle δ˜ can be calculated based on the $\omega_z$-angular rate measured by a gyro in IMU 240 with compensation for bias, V speed measured by GNSS receiver, and fixed length L which is measured on the machine in advance so the value is known for the angle δ˜ calculation. In one embodiment, R is determined using vehicle position data and vehicle motion data. The tilde symbol ("˜") shown in the superscript of angle δ˜ is used to indicate that the angle δ˜ is a measured value. As noted above, the data pertaining to angle δ˜ is very noisy. Rate $\omega_z$ has an intrinsic noise caused by thermal noise, vibration, and other effects which impact the gyro. Speed V located in the denominator is typically a low value that tends to become zero for slow moving machines. Such a small denominator will cause an increase impact of gyro intrinsic noise included in the value of angle δ˜. This increase in noise can prevent the machine from steering correctly in an automatic mode. The front wheels of the machine would start dithering back and forth about the desired path which would cause the path traversed to not be straight due to the dithering of the front wheels causing oscillation of the machine about the desired path.

Figure 5:
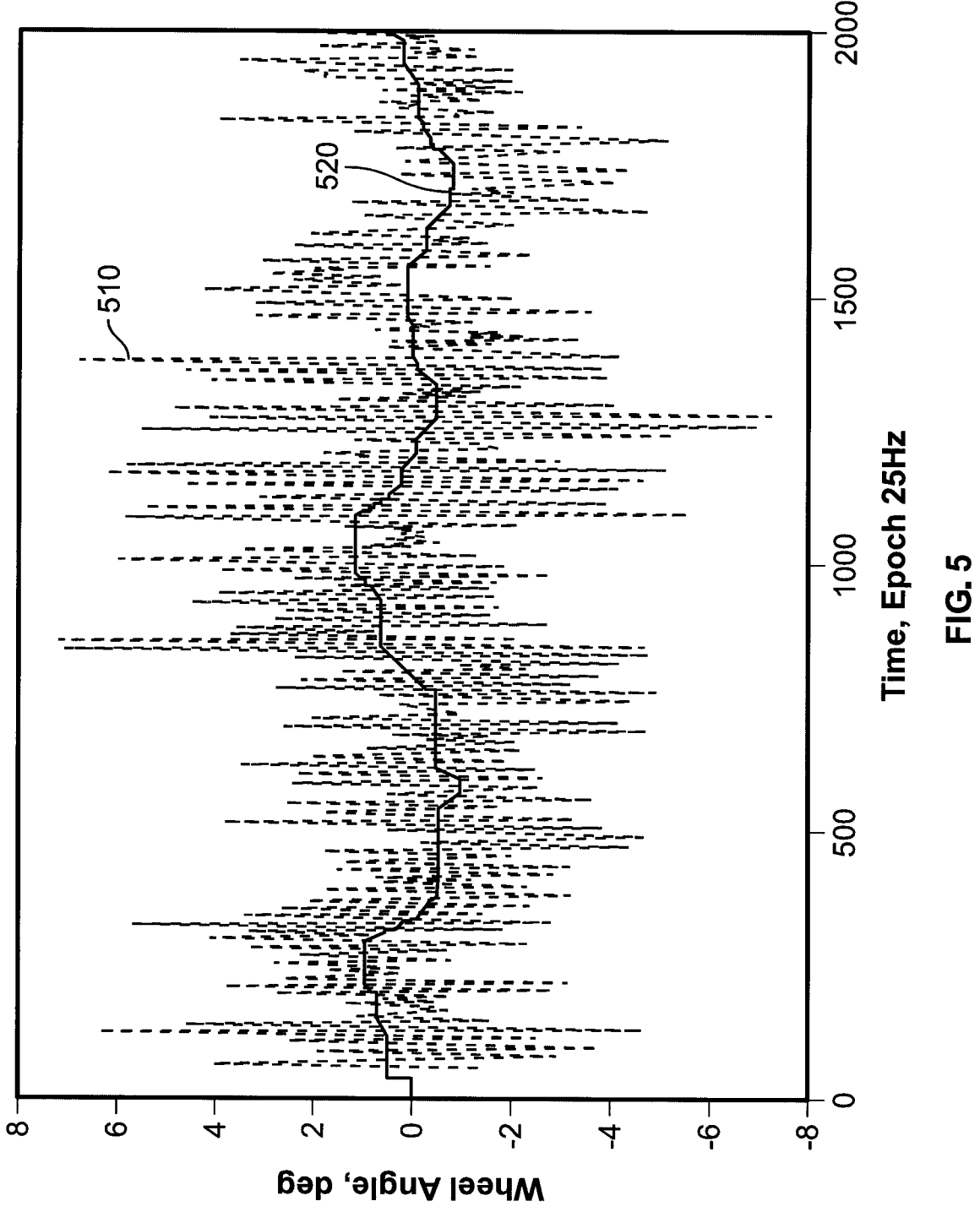
FIG. 5 shows a graph pertaining to wheel angle estimation based on the ratio of ωz/V versus a mechanical wheel angle sensor (WAS)

FIG. 5 shows a graph pertaining to wheel angle estimation over time based on the ratio of $\omega_z/V$ versus a mechanical wheel angle sensor (WAS). Waveform 510 (i.e., the dashed line) is an example of the estimation of angle δ˜ of wheel 415 based on equation (1) (ratio $\omega_z/V$) for a machine moving along a straight line and having active automatic steering. For the sake of comparison, FIG. 5 additionally shows waveform 520 (i.e., the solid line) which represents the wheel angle directly measured by mechanical wheel angle sensor (WAS) installed on tie rod of Ackermann type steering geometry as a reference angle δ. The automatic steering previously described uses this WAS in a control loop. The strong noise error shown by graph 510 can be seen when compared to graph 520.

Typically, noise is removed using low pass filtering (LPF). However, in the present case, LPF would not be beneficial because it would introduce delay (e.g., latency) in the control loop and the machine would react very slowly in response to any spurious impact caused by imperfections on the surface of the ground over which the machine travels.

In one embodiment, highly accurate data from encoder 339 is used to remove noise. Encoder measurements show an amount of shaft rotation which can be converted, using a fixed reduction ratio (RR) factor, into an equivalent amount of wheel turning. To do this properly, the bias in the encoder measurement needs to be taken into account. There are two sources of bias. The first source is the fixed initial offset for an incremental type encoder. The second source is associated with hydraulic fluid leakage in the steering unit interrupting proper operation of the encoder. Bias slowly changes in real time and should be tracked.

Figure 6:
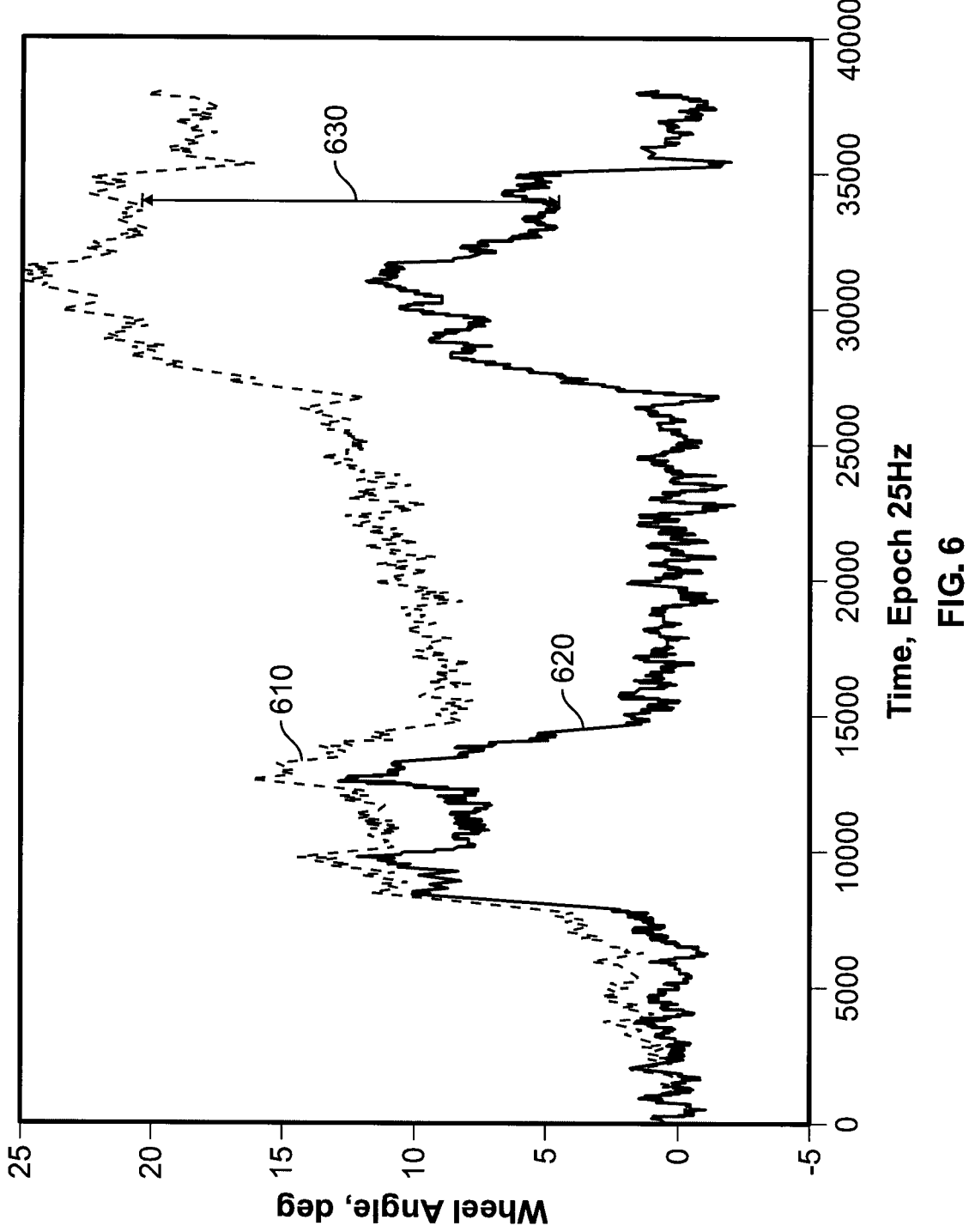
FIG. 6 shows a graph having a waveform pertaining to steering wheel angle encoder bias drift and a waveform pertaining to a mechanical WAS.

FIG. 6 shows a graph having a waveform pertaining to steering wheel angle encoder bias (also referred to as drift) and a waveform pertaining to a mechanical WAS. Waveform 610 (i.e., the dashed line) is shown representing encoder 339 measurements converted using the fixed RR factor into an equivalent wheel angle in comparison with waveform 620 (solid line) of mechanical WAS. The steering wheel has been intensively rotated two times back and forth during the data collection interval. The two jumps/pulses on waveforms 610 and 620 correspond to these rotations. There is a constantly changing value of bias 630 which is the difference between converted encoder 339 data and a true value from the WAS in each moment of time. The noise level in both encoder 339 and WAS is almost the same. There is little to no degradation of precision in the wheel angle based on encoder data vs wheel angle measured by mechanical WAS. There is no degradation in the context of equation (1). However, bias 630 should be estimated and subtracted from encoder 339 measurements.

Figure 7:
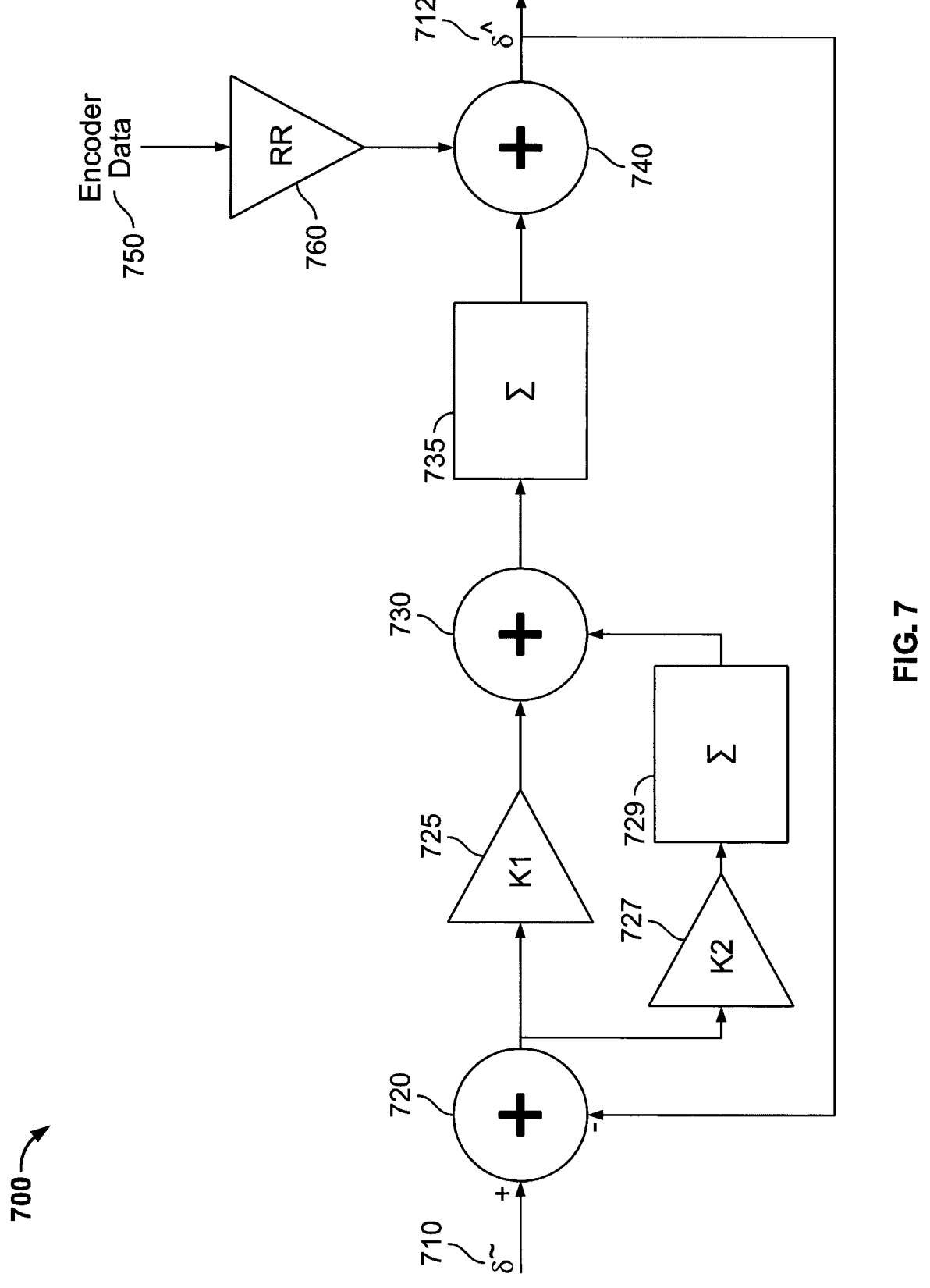
FIG. 7 shows a block diagram of an algorithm used to smooth noise in a sensed wheel angle.

FIG. 7 shows a block diagram of a filtering algorithm used to smooth noise in a sensed wheel angle. Wheel angle filter algorithm 700, according to one embodiment, includes components as follows. Noisy measurement of angle δ˜ 710 calculated according to equation (1) is passed through a filter algorithm to generate a clean and accurate estimation angle δ^ 712. The carat symbol ("^") shown in the superscript of angle δ^ is used to indicate that angle δ^ is an estimation as opposed to angle δ˜ which is a measured angle. It should be noted that both angle δ^ and angle δ˜ refer to a current wheel angle. Subtraction unit 720 subtracts output δ^ 712 from input δ˜ 710. The negative sign under subtraction unit 720 is used to show that 700 is negative feedback loop filter. The difference output from subtraction unit 720 is amplified by factor K1 in amplifier 725. The difference output from subtraction unit 720 is also amplified by K2 in amplifier 727, and accumulated (i.e., integrated) in block 729. Adder 730 sums both inputs together and the result is accumulated in block 735. Encoder data 750 from encoder 339 is converted into an equivalent wheel angle by multiplication using RR factor in block 760. The output of block 760 is then combined with the result of integration 735 in adder 740. Adder 740 outputs accurate estimation δ^ 712. This is a second order closed loop due to both proportional and integral components. A second order or more is used because when bias 630 shown in FIG. 6 is continuous it can be approximated by a linear function. Factors K1 and K2 are tuning parameters adjusted to provide a suitable filtering speed of bias (i.e., drift) and smooth the transition process at initialization. Alternatively, other types of filtering can be used. In this embodiment, encoder 339 data, which is very precise but not very accurate, is combined with $\tilde{\delta}$ 710 data, which is not very precise but very accurate. As such, they complement each other and result $\hat{\delta}$ 712 is both highly precise and highly accurate.

Figures 8A, 8B:
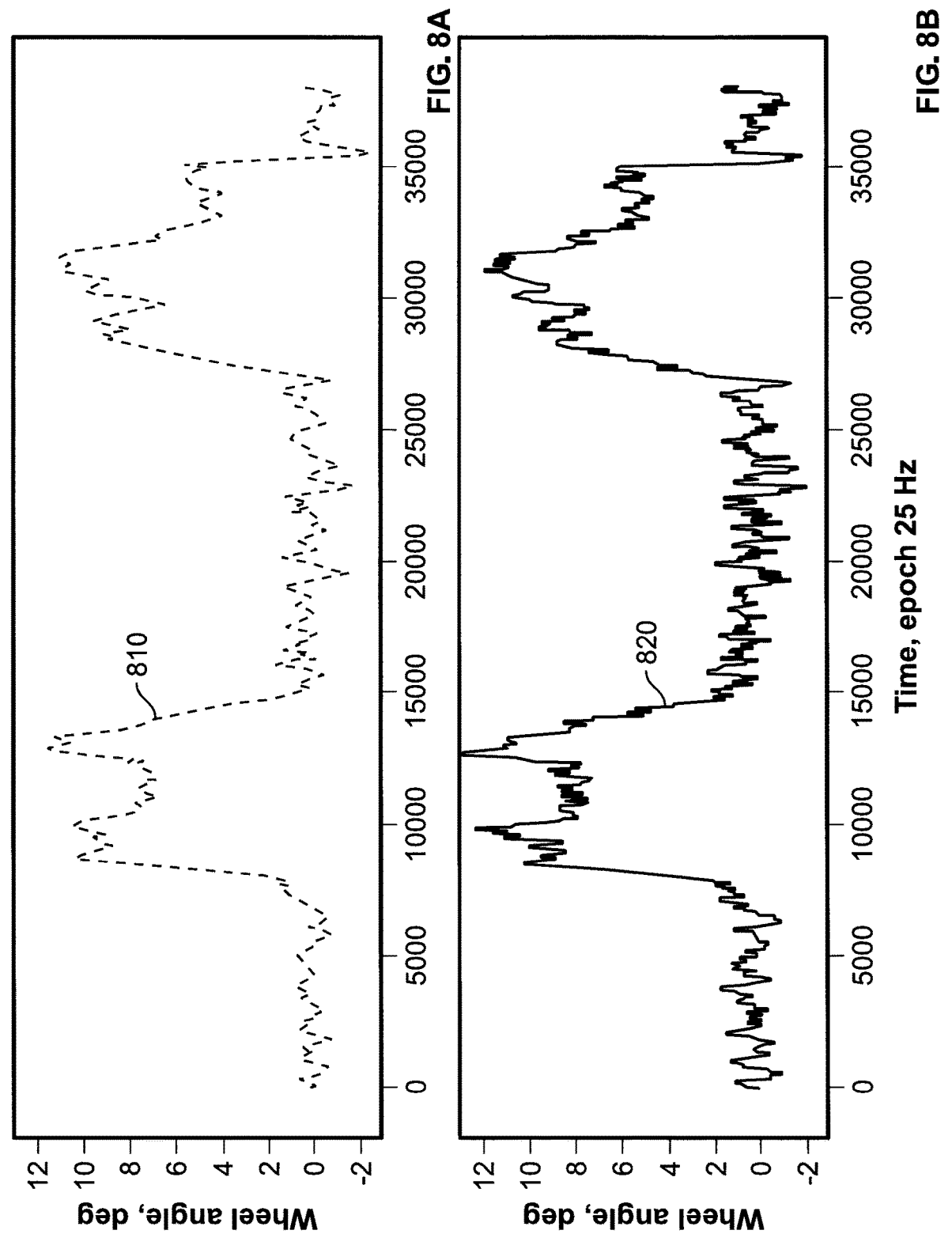
FIG. 8A shows a graph of wheel angle estimation with encoder information.
FIG. 8B shows a graph of measured wheel angle by a mechanical WAS.

FIG. 8A shows waveform 810 of wheel angle accurate estimation $\hat{\delta}$ over time based on experimental data. For the sake of comparison, FIG. 8B shows waveform 820 of the wheel angle directly measured by a mechanical WAS over time. The steering wheel has been intensively rotated two times back and forth. It can be seen that waveforms 810 and 820 are almost identical and there is no noise or bias.

Figure 9:
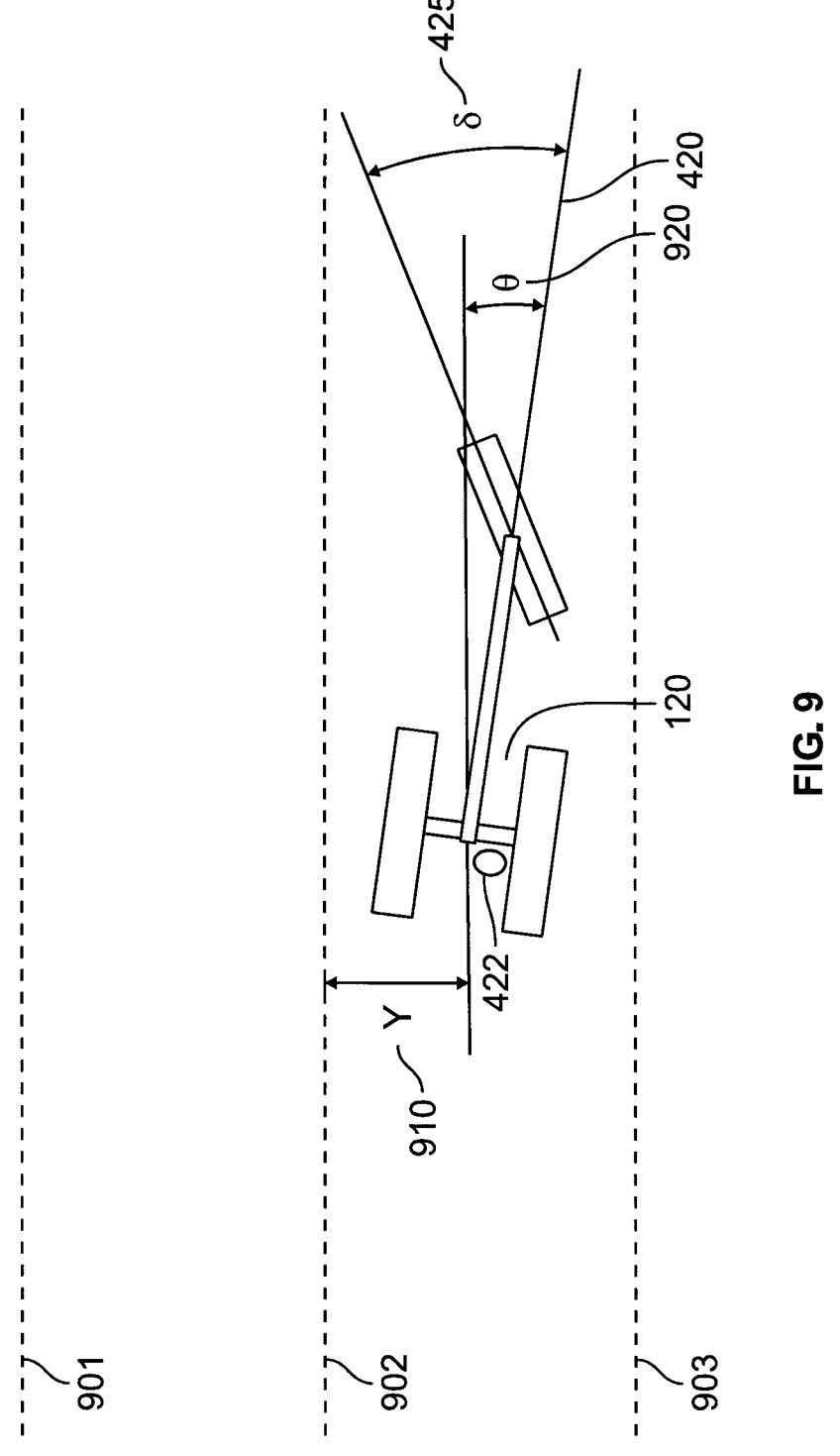
FIG. 9 shows parameters associated with calculating a desired wheel angle.

FIG. 9 shows parameters associated with calculating a desired wheel angle.

A tricycle model of vehicle 120 is shown located in an agricultural field having parallel straight lines 901, 902, 903. Vehicle 120 should be automatically steered to follow one of these lines (currently, vehicle 120 is shown following line 902). Special point O 422 has a perpendicular distance Y 910 to line 902 which is called the cross track metric. This metric Y is used not only for algorithmic calculation but also for measuring steering quality which is expected to have a standard deviation of a few centimeters. Central axis 420 of vehicle 120 forms angle θ 920 with respect to line 902 called the angular heading offset metric. In order for vehicle 120 to follow line 902 both metrics (i.e., cross track and angular heading offset) should be minimized and be almost 0 (when considered using absolute values). Cross track should be 0 because special point O 422 should be coincident with line 902 for proper agricultural operation. Angular heading offset should be 0 because direction of central axis 420 should align with direction of line 902. If direction of central axis 420 and line 902 are not aligned, vehicle 120 will be moved away from line 902 based on its speed V despite point O 422 being located coincident with line 902. However, vehicle 120 has only one degree of freedom which is wheel steering angle δ 425 for controlling these two metrics to achieve a desired wheel angle. As such, the two metrics can be converted into single scalar form of desired wheel angle (called setpoint) by the linear equation $$\delta_{setpoint} = w_1 * Y + w_2 * \theta \qquad (2)$$

where $w_1$ and $w_2$ are weight factors with $w_1 + w_2 = 1$. This condition means increasing $w_1$ will result in decreasing $w_2$ and vice versa Tuning of $w_1$ and $w_2$ can be used to achieve desired steering performance. The greater $w_1$, the faster the steered wheel will react to cross track. The greater $w_2$, the faster the steered wheel will react to angular heading offset. A balance between $w_1$ and $w_2$ provides for a short transition process at initial line 902 acquisition from side position and accurate and smooth line 902 tracking without oscillation. Other algorithms can be used as well.

Figure 10:
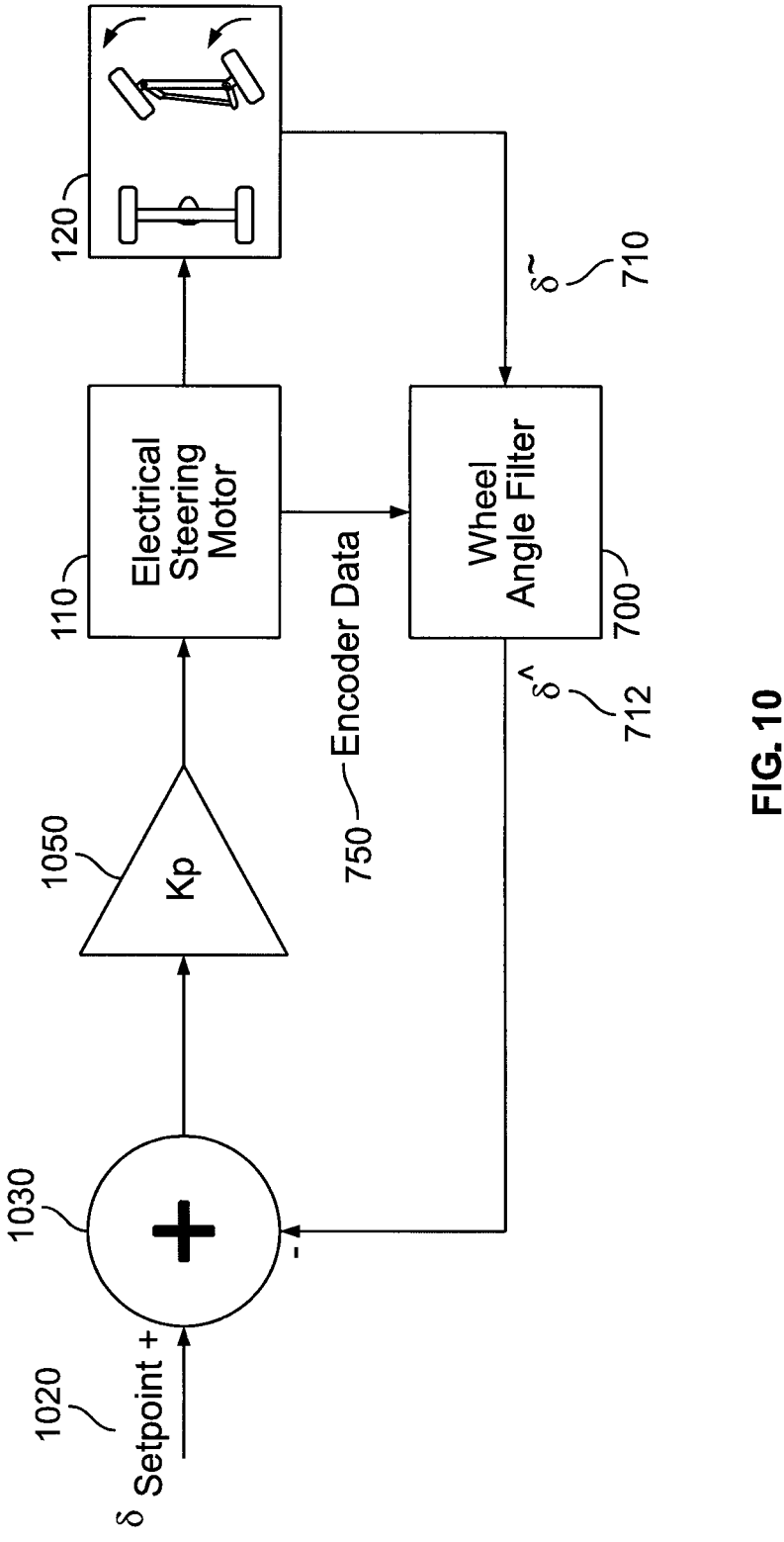
FIG. 10 shows a schematic of a control algorithm used by a motor controller according to one embodiment.

FIG. 10 shows a schematic of a control algorithm used by [AZ1]microcontroller unit 250 shown in FIG. 2 according to one embodiment. The control algorithm is a control loop to control electrical steering motor 110 according one embodiment. In this embodiment, the control loop functions as a proportional (P) controller. The input is a desired value of wheel angle $\delta_{setpoint}$ 1020 Subtraction unit 1030 subtracts estimated angle $\hat{\delta}$ 712 from input $\delta_{setpoint}$ 1020. The difference between the two is then amplified by Kp in amplifier 1050 which sets a rate and direction of rotation (e.g., sign) of electrical steering motor 110. Control loop FIG. 10 turns the wheels of machine 120 based on angle $\tilde{\delta}$ 710 and encoder data 750 which are both input into wheel angle filter 700. Filter 700 outputs estimation angle $\hat{\delta}$712 which is input to subtraction unit 1030. Other loops can be used as well.

Figures 11A, 11B:
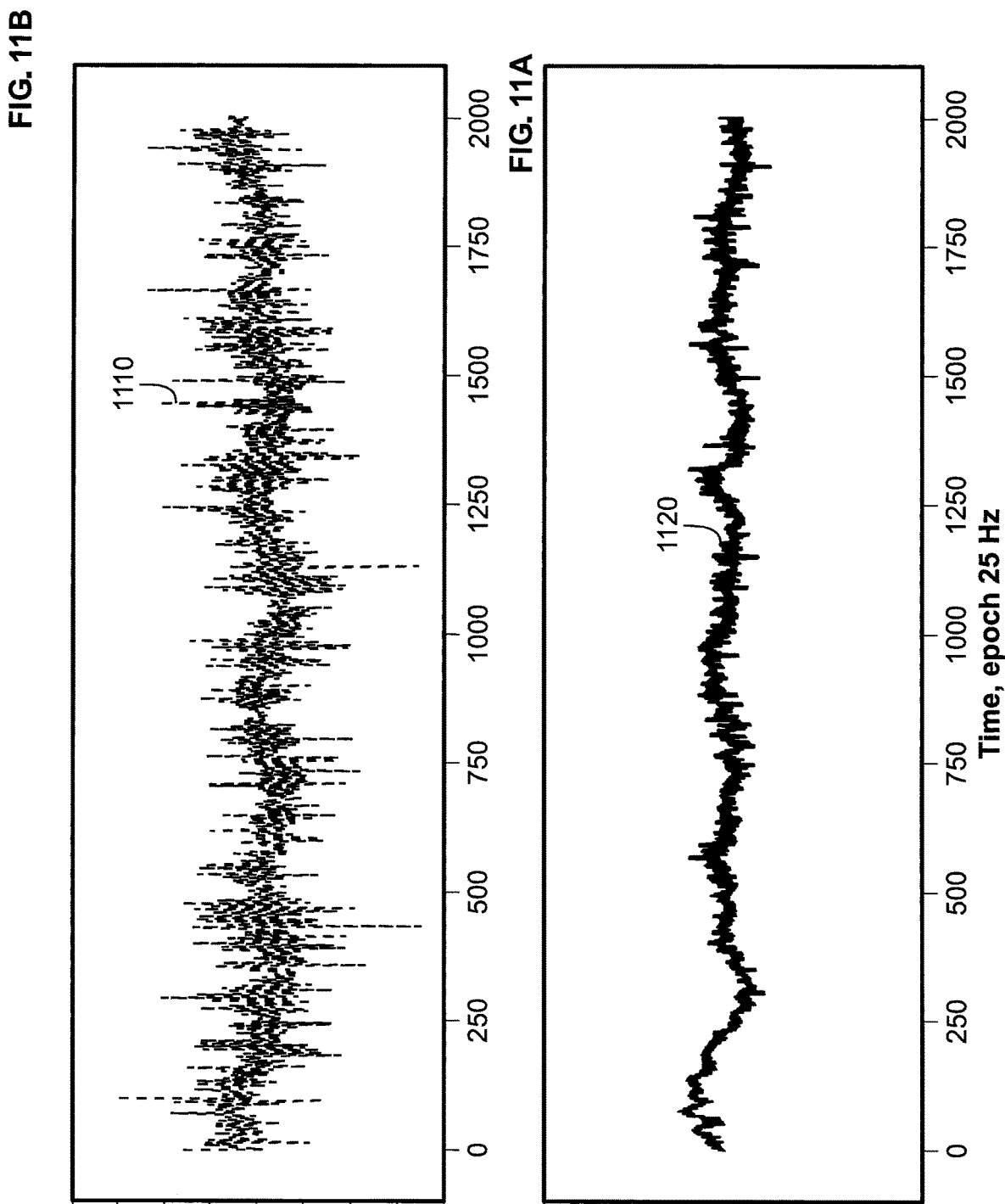
FIG. 11A shows a graph representing cross track without the use of encoder information.
FIG. 11B shows a graph representing cross track with the use of encoder information.

FIG. 11A shows waveform 1110 representing cross track Y if the control loop uses only noisy $\tilde{\delta}$ 710 without encoder data 750. FIG. 11B shows waveform 1120 representing cross track error Y of machine driving straight line with automatic steering according to the control algorithm of FIG. 10 which uses both noisy $\tilde{\delta}$ 710 and encoder data 750. It can be seen in waveform 1110 that noise in $\tilde{\delta}$ 710 penetrates the control loop, resulting in wheel dithering and noisy cross track error which is not suitable for typical agricultural operation. Waveform 1120 vs 1110 is less noisy, has a standard deviation of a few centimeters, and suitable for operation. An articulated machine has been used to collect data for these graphs to accent these differences due to machine specifics. Such a machine is very sensitive to the accuracy of angle $\tilde{\delta}$ 710 because of a specific kinematic schematic designed to minimize turning radius so that the machine very aggressively follows incorrect steering commands due to noise.

In various embodiments, a machine can have front wheel steering, rear wheel steering, or all wheel steering. The machine may also be articulated with a steerable tractor portion that is rotatably connected to a trailed portion (i.e., frames mounted to each other via a rotation joint). Alternatively, the machine can be a tracked machine or it can be a windrower with two active front wheels and two passive back wheels. In one embodiment, steering can be accomplished by differential angular speed between left and right tracks or front wheels. In most embodiments, the machine has a steering shaft connected to electrical steering motor 110.

Figure 12:
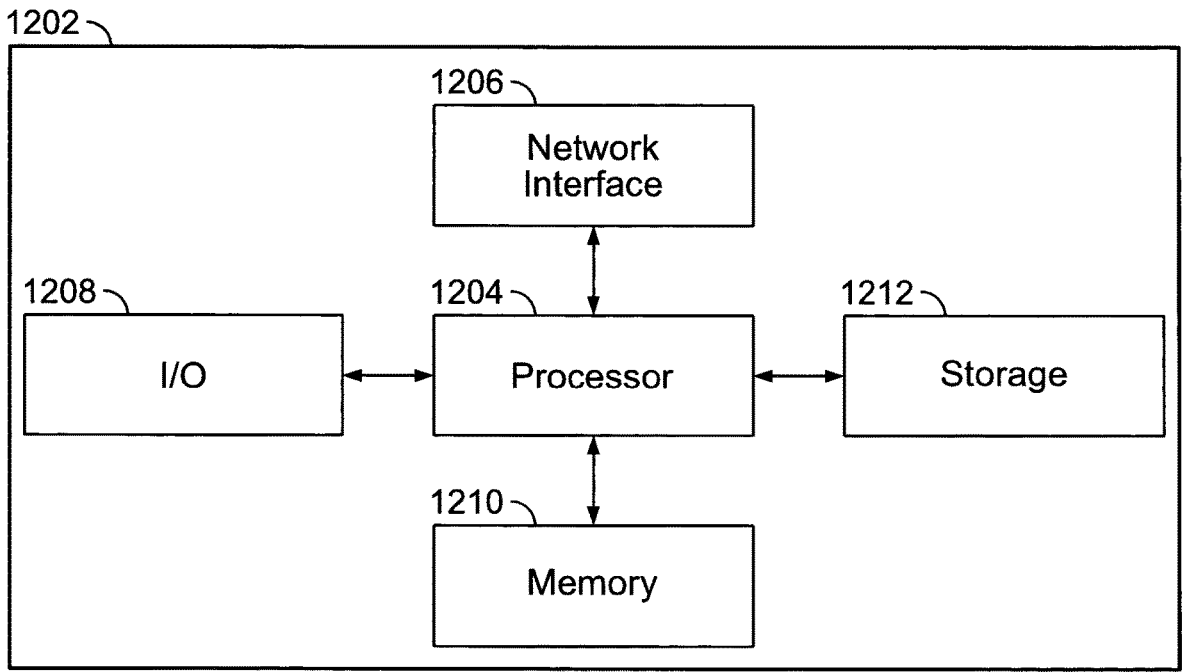
FIG. 12 shows a high-level schematic of a computer that can be used to implement the method and devices described herein.

Although various components have been described as being implemented using application-specific integrated circuits (ASICs), other implementations can be used as well. For example, in various embodiments, a computer can be used to implement the various devices (i.e., UI display, GNSS controller, electrical steering motor, RF front end, MCU, IMU, algorithm of FIG. 7, algorithm of FIG. 10 etc.) and also to perform the various methods and operations described herein. A high-level block diagram of such a computer is illustrated in FIG. 12. Computer 1202 contains a processor 1204 which controls the overall operation of the computer 1202 by executing computer program instructions which define such operation. The computer program instructions may be stored in a storage device 1212, or other computer readable medium (e.g., magnetic disk, CD ROM, etc.), and loaded into memory 1210 when execution of the computer program instructions is desired. Thus, the methods and operations described herein can be defined by the computer program instructions stored in the memory 1210 and/or storage 1212 and controlled by the processor 1204 executing the computer program instructions. For example, the computer program instructions can be implemented as computer executable code programmed by one skilled in the art to perform an algorithm defined by the methods and operations described herein. Accordingly, by executing the computer program instructions, the processor 1204 executes an algorithm defined by the methods and operations described herein. The computer 1202 also includes one or more network interfaces 2606 for communicating with other devices via a network. The computer 1202 also includes input/output devices 2608 that enable user interaction with the computer 1202 (e.g., display, keyboard, mouse, speakers, buttons, etc.). One skilled in the art will recognize that an implementation of an actual computer could contain other components as well, and that FIG. 12 is a high-level representation of some of the components of such a computer for illustrative purposes.

The foregoing Detailed Description is to be understood as being in every respect illustrative and exemplary, but not restrictive, and the scope of the inventive concept disclosed herein should be interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method for steering a vehicle comprising:
receiving vehicle position data from a Global Navigation Satellite System (GNSS) receiver;
receiving vehicle motion data from an Inertial Measurement Unit (IMU);
receiving steering shaft encoder data from a steering shaft rotation encoder;
determining a current wheel angle of the vehicle based on the vehicle position data, the vehicle motion data, and the steering shaft encoder data;
determining a steering command based on the current wheel angle and a desired wheel angle; and
transmitting the steering command to a steering motor, wherein the current wheel angle of the vehicle is determined using the equation:

$$atan\left(\frac{L * \omega_z}{V}\right)$$

where L is a length between a front axle and a rear axle of the vehicle, $\omega_z$ is a vertical angular rate of the vehicle, and V is a longitudinal speed of the vehicle, and the result of the equation is filtered using a second order closed loop filter that uses encoder data multiplied by a reduction ratio factor.

2. The method of claim 1, wherein $\omega_z$ is measured by a vertical gyro as the vehicle motion data.

3. The method of claim 2, wherein V is determined using the vehicle position data.

4. The method of claim 3, wherein the desired wheel angle is determined using the equation:

$$w_1 * Y + w_2 * \theta$$

where $w_1$ and $w_2$ are weight factors, Y is a cross track metric, and $\theta$ is an angular heading offset.

5. An automatic steering system for a vehicle comprising:
a global navigation satellite system (GNSS) receiver for transmitting vehicle position data to a steering controller;
an inertial measurement unit (IMU) for transmitting vehicle motion data to the steering controller; and
a steering shaft rotation encoder for transmitting steering shaft encoder data to the steering controller, wherein the steering controller is configured to:
determine a current wheel angle using the vehicle position data, the vehicle motion data, and the steering shaft encoder data;
determine a steering command based on a current wheel angle and a desired wheel angle; and
transmit the steering command to a steering motor,
wherein the current wheel angle of the vehicle is determined using the equation:

$$atan\left(\frac{L * \omega_z}{V}\right)$$

where L is a length between a front axle and a rear axle of the vehicle, $\omega_z$ is a vertical angular rate of the vehicle, and V is a longitudinal speed of the vehicle, and the result of the equation is filtered using a second order closed loop filter that uses encoder data multiplied by a reduction ratio factor.

6. The system of claim 5, wherein $\omega_z$ is measured by a vertical gyro as the vehicle motion data.

7. The system of claim 6, wherein V is determined using the vehicle position data.

8. The system of claim 7, wherein the desired wheel angle is determined using the equation:

$$w_1 * Y + w_2 * \theta$$

where $w_1$ and $w_2$ are weight factors, Y is a cross track metric, and $\theta$ is an angular heading offset.

9. A computer readable medium storing computer program instructions for determining a position of a mobile station, the computer program instructions, when executed on a processor, cause the processor to perform operations comprising:
receiving vehicle position data from a Global Navigation Satellite System (GNSS) receiver;
receiving vehicle motion data from an Inertial Measurement Unit (IMU);
receiving steering shaft encoder data from a steering shaft rotation encoder;
determining a current wheel angle of the vehicle based on the vehicle position data, the vehicle motion data, and the steering shaft encoder data;
determining a steering command based on the current wheel angle and a desired wheel angle; and
transmitting the steering command to a steering motor, wherein the current wheel angle of the vehicle is determined using the equation:

$$atan\left(\frac{L * \omega_z}{V}\right)$$

where L is a length between a front axle and a rear axle of the vehicle, $\omega_z$ is a vertical angular rate of the vehicle, and V is a longitudinal speed of the vehicle, and the result of the equation is filtered using a second order closed loop filter that uses encoder data multiplied by a reduction ratio factor.

10. The computer readable medium of claim 9, wherein $\omega_z$ is measured by a vertical gyro as the vehicle motion data.

11. The computer readable medium of claim 10, wherein V is determined using the vehicle position data.

12. The computer readable medium of claim 11, wherein the desired wheel angle is determined using the equation:

$$w_1 * Y + w_2 * \theta$$

where $w_1$ and $w_2$ are weight factors, Y is a cross track metric, and $\theta$ is an angular heading offset.

* * * * *